United States Patent
Hosomi

(10) Patent No.: US 12,553,485 B2
(45) Date of Patent: Feb. 17, 2026

(54) DISC BRAKE PAD AND DISC BRAKE CALIPER

(71) Applicant: SHIMANO INC., Sakai (JP)

(72) Inventor: Yusuke Hosomi, Sakai (JP)

(73) Assignee: SHIMANO INC., Sakai (JP)

( * ) Notice: Subject to any disclaimer, the term of this patent is extended or adjusted under 35 U.S.C. 154(b) by 426 days.

(21) Appl. No.: 18/348,352

(22) Filed: Jul. 7, 2023

(65) Prior Publication Data

US 2025/0012336 A1 Jan. 9, 2025

(51) Int. Cl.
| | | |
|---|---|---|
| *F16D 65/847* | (2006.01) | |
| *F16D 65/092* | (2006.01) | |
| *F16D 55/00* | (2006.01) | |
| *F16D 65/00* | (2006.01) | |
| *F16D 65/78* | (2006.01) | |

(52) U.S. Cl.
CPC ......... *F16D 65/847* (2013.01); *F16D 65/092* (2013.01); *F16D 2055/0016* (2013.01); *F16D 65/0068* (2013.01); *F16D 2065/789* (2013.01)

(58) Field of Classification Search
CPC .. F16D 65/0068; F16D 65/092; F16D 65/847; F16D 2055/0016; F16D 2065/789
USPC ...................... 188/250 B, 250 G, 258, 264 R
See application file for complete search history.

(56) References Cited

U.S. PATENT DOCUMENTS

| | | | | |
|---|---|---|---|---|
| 7,905,335 B2* | 3/2011 | Demers | ................. | F16D 65/847 188/258 |
| 8,869,956 B2* | 10/2014 | Wen | ...................... | F16D 65/847 188/264 R |
| 9,393,706 B2* | 7/2016 | Quadagno | ............... | B26B 13/28 |
| 9,487,263 B2* | 11/2016 | Iwai | ......................... | B62L 1/00 |
| 11,091,220 B2* | 8/2021 | Meggiolan | ............ | F16D 65/095 |
| 2015/0090538 A1* | 4/2015 | Moore | ................... | F16D 65/847 188/1.11 W |
| 2015/0090543 A1* | 4/2015 | Moore | ..................... | F16D 69/00 188/250 G |
| 2015/0211590 A1 | 7/2015 | Tseng | | |
| 2020/0039604 A1 | 2/2020 | Meggiolan et al. | | |
| 2023/0057181 A1 | 2/2023 | Hosomi | | |
| 2023/0174191 A1 | 6/2023 | Fujii et al. | | |
| 2023/0175562 A1 | 6/2023 | Koshiyama et al. | | |

FOREIGN PATENT DOCUMENTS

| | | |
|---|---|---|
| DE | 202016102626 U1 | 7/2016 |
| DE | 102022130604 | 6/2023 |
| DE | 102022130605 | 6/2023 |
| DE | 102023104602 | 8/2024 |

* cited by examiner

*Primary Examiner* — Christopher P Schwartz
(74) *Attorney, Agent, or Firm* — MORI & WARD, LLP

(57) ABSTRACT

A disc brake pad comprises a base plate, a friction pad, a first fin, and a second fin. The base plate includes a first surface. The friction pad is provided on the first surface. The first fin extends along a first edge of the base plate. The first fin includes a first fin end and protrudes from the base plate to the first fin end in a first direction. The first fin has a first distance defined between the first surface and the first fin end in the first direction. The second fin includes a second fin end and protrudes from the base plate to the second fin end in the first direction. The second fin has a second distance defined between the first surface and the second fin end in the first direction. The second distance is longer than the first distance.

25 Claims, 12 Drawing Sheets

DISC BRAKE PAD AND DISC BRAKE CALIPER

BACKGROUND

Technical Field

The present invention relates to a disc brake pad and a disc brake caliper.

Background Information

A human-powered vehicle includes a brake system. The brake system includes a brake caliper and a brake rotor. The brake caliper includes a caliper member, a piston, and a brake pad. One of objects of the present disclosure is to effectively discharge heat generated by sliding between the brake pad and the brake rotor.

SUMMARY

In accordance with a first aspect of the present invention, a disc brake pad comprises a base plate, a friction pad, a first fin, and a second fin. The base plate includes a first surface. The friction pad is provided on the first surface. The first fin extends along a first edge of the base plate. The first fin includes a first fin end and protrudes from the base plate to the first fin end in a first direction. The first fin has a first distance defined between the first surface and the first fin end in the first direction. The second fin includes a second fin end and protrudes from the base plate to the second fin end in the first direction. The second fin has a second distance defined between the first surface and the second fin end in the first direction. The second distance is longer than the first distance.

With the disc brake pad according to the first aspect, the second fin can efficiently increase a surface area of the disc brake pad while reducing or preventing unnecessary contact between the caliper body and at least one of the first fin and the second fin. Thus, it is possible to effectively discharge heat generated by sliding between the friction pad and a disc brake rotor while enabling the disc brake pad to move smoothly.

In accordance with a second aspect of the present invention, the disc brake pad according to the first aspect is configured so that the first fin extends in a second direction defined along the first surface. The second fin extends in the second direction. The first fin has a first length defined in the second direction. The second fin has a second length defined in the second direction. The first length is different from the second length.

With the disc brake pad according to the second aspect, it is possible to reliably reduce or prevent unnecessary contact between the caliper body and at least one of the first fin and the second fin.

In accordance with a third aspect of the present invention, the disc brake pad according to the second aspect is configured so that the first length is longer than the second length.

With the disc brake pad according to the third aspect, the first fin and the second fin can efficiently increase the surface area of the disc brake pad while reducing or preventing unnecessary contact between the caliper body and at least one of the first fin and the second fin. Thus, it is possible to more effectively discharge heat generated by sliding between the friction pad and the disc brake rotor while enabling the disc brake pad to move smoothly.

In accordance with a fourth aspect of the present invention, the disc brake pad according to any one of the first to third aspects is configured so that the second fin is provided closer to the friction pad than the first fin as viewed in the first direction.

With the disc brake pad according to the fourth aspect, the first fin and the second fin can effectively discharge heat generated by sliding between the friction pad and a disc brake rotor. Thus, it is possible to more effectively discharge heat generated by sliding between the friction pad and the disc brake rotor while enabling the disc brake rotor to move smoothly.

In accordance with a fifth aspect of the present invention, a disc brake pad comprises a base plate, a friction pad, a first fin, and a second fin. The base plate includes a first surface. The friction pad is provided on the first surface. The first fin includes a first fin end and protrudes from the base plate to the first fin end in a first direction. The first fin has a first distance defined between the first surface and the first fin end in the first direction. The first fin extends along a second direction defined along the first surface. The first fin has a first length defined in the second direction. The second fin includes a second fin end and protrudes from the base plate to the second fin end in the first direction. The second fin has a second distance defined between the first surface and the second fin end in the first direction. The second distance is longer than the first distance. The second fin extends in the second direction. The second fin has a second length defined in the second direction. The first length is longer than the second length. The second fin is provided closer to the friction pad than the first fin as viewed in the first direction.

With the disc brake pad according to the fifth aspect, the first fin and the second fin can efficiently increase a surface area of the disc brake pad while reducing or preventing unnecessary contact between the caliper body and at least one of the first fin and the second fin. Thus, it is possible to effectively discharge heat generated by sliding between the friction pad and a disc brake rotor while enabling the disc brake rotor to move smoothly.

In accordance with a sixth aspect of the present invention, the disc brake pad according to any one of the first to fifth aspects is configured so that the second fin end of the second fin is provided entirely father from the first surface than the first fin end of the first fin in the first direction.

With the disc brake pad according to the sixth aspect, the second fin can efficiently increase the surface area of the disc brake pad while reducing or preventing unnecessary contact between the caliper body and at least one of the first fin and the second fin.

In accordance with a seventh aspect of the present invention, the disc brake pad according to any one of the first to sixth aspects further comprises a third fin. The third fin includes a third fin end and protrudes from the base plate to the third fin end in the first direction. The third fin has a third distance defined between the first surface and the third fin end in the first direction. The third distance is longer than the first distance.

With the disc brake pad according to the seventh aspect, the third fin can efficiently increase the surface area of the disc brake pad while reducing or preventing unnecessary contact between the caliper body and at least one of the first fin, the second fin, and the third fin.

In accordance with an eighth aspect of the present invention, the disc brake pad according to the seventh aspect is configured so that the third distance is longer than the second distance.

With the disc brake pad according to the eighth aspect, the third fin can more efficiently increase the surface area of the disc brake pad while reducing or preventing unnecessary contact between the caliper body and at least one of the first fin, the second fin, and the third fin.

In accordance with a ninth aspect of the present invention, the disc brake pad according to the seventh or eighth aspect is configured so that the first fin extends in a second direction defined along the first surface. The second fin extends in the second direction. The third fin extends in the second direction. The first fin has a first length defined in the second direction. The second fin has a second length defined in the second direction. The third fin has a third length defined in the second direction. The first length is different from each of the second length and the third length.

With the disc brake pad according to the ninth aspect, it is possible to reliably reduce or prevent unnecessary contact between the caliper body and at least one of the first fin, the second fin, and the third fin.

In accordance with a tenth aspect of the present invention, the disc brake pad according to the ninth aspect is configured so that the second length is different from the third length.

With the disc brake pad according to the tenth aspect, it is possible to more reliably reduce or prevent unnecessary contact between the caliper body and at least one of the first fin, the second fin, and the third fin.

In accordance with an eleventh aspect of the present invention, the disc brake pad according to the ninth or tenth aspect is configured so that the first length is longer than each of the second length and the third length.

With the disc brake pad according to the eleventh aspect, the first fin and the third fin can efficiently increase the surface area of the disc brake pad while reducing or preventing unnecessary contact between the caliper body and at least one of the first fin, the second fin, and the third fin.

In accordance with a twelfth aspect of the present invention, the disc brake pad according to any one of the ninth to eleventh aspects is configured so that the second length is longer than the third length.

With the disc brake pad according to the twelfth aspect, the first fin, the second fin, and the third fin can efficiently increase the surface area of the disc brake pad while reducing or preventing unnecessary contact between the caliper body and at least one of the first fin, the second fin, and the third fin.

In accordance with a thirteenth aspect of the present invention, the disc brake pad according to any one of the sixth to twelfth aspects is configured so that the second fin end of the second fin is provided entirely father from the first surface than the first fin end of the first fin in the first direction. The third fin end of the third fin is provided entirely father from the first surface than the first fin end of the first fin in the first direction.

With the disc brake pad according to the thirteenth aspect, the first fin, the second fin, and the third fin can more efficiently increase the surface area of the disc brake pad while reducing or preventing unnecessary contact between the caliper body and at least one of the first fin, the second fin, and the third fin.

In accordance with a fourteenth aspect of the present invention, the disc brake pad according to any one of the ninth to thirteenth aspects is configured so that the second fin is at least partially provided between the first fin and the third fin.

With the disc brake pad according to the fourteenth aspect, the first fin, the second fin, and the third fin can more efficiently increase the surface area of the disc brake pad while reducing or preventing unnecessary contact between the caliper body and at least one of the first fin, the second fin, and the third fin.

In accordance with a fifteenth aspect of the present invention, the disc brake pad according to any one of the ninth to fourteenth aspects further comprises an additional base part provided between the second fin and the third fin as viewed in the first direction.

With the disc brake pad according to the fifteenth aspect, the additional base part can reinforce the second fin and the third fin.

In accordance with a sixteenth aspect of the present invention, the disc brake pad according to the fifteenth aspect is configured so that the second fin protrudes from the additional base part to the second fin end in the first direction. The second fin has a second additional distance defined between the additional base part and the second fin end in the first direction. The third fin protrudes from the additional base part to the third fin end in the first direction. The third fin has a third additional distance defined between the additional base part and the third fin end in the first direction. The third additional distance is longer than the second additional distance.

With the disc brake pad according to the sixteenth aspect, the second fin and the third fin can efficiently increase the surface area of the disc brake pad while the additional base part reinforces the second fin and the third fin.

In accordance with a seventeenth aspect of the present invention, the disc brake pad according to the sixteenth aspect is configured so that the base plate includes a hole. The third fin is spaced apart from the hole.

With the disc brake pad according to the seventeenth aspect, it is possible to reduce or prevent unnecessary contact between the third fin and a member extending through the hole.

In accordance with an eighteenth aspect of the present invention, the disc brake pad according to the sixteenth or seventeenth aspect is configured so that the third fin includes a fourth fin and a fifth fin. The fourth fin is spaced apart from the fifth fin.

With the disc brake pad according to the eighteenth aspect, it is possible to use a space provided between the fourth fin and the fifth fin.

In accordance with a nineteenth aspect of the present invention, the disc brake pad according to any one of the sixteenth to eighteenth aspect is configured so that the fourth fin and the fifth fin are spaced apart from the hole.

With the disc brake pad according to the nineteenth aspect, it is possible to reliably reduce or prevent unnecessary contact between the third fin and a member extending through the hole.

In accordance with a twentieth aspect of the present invention, the disc brake pad according to any one of the sixteenth to nineteenth aspects is configured so that the fourth fin includes a fourth fin end and protrudes from the first surface to the fourth fin end in the first direction. The fourth fin has a fourth distance defined between the first surface and the fourth fin end in the first direction. The fourth distance is longer than the first distance.

With the disc brake pad according to the twentieth aspect, the fourth fin can efficiently increase the surface area of the disc brake pad while reducing or preventing unnecessary contact between the caliper body and the fourth fin.

In accordance with a twenty-first aspect of the present invention, the disc brake pad according to the twentieth aspect is configured so that the fifth fin includes a fifth fin end and protrudes from the first surface to the fifth fin end in the first direction. The fifth fin has a fifth distance defined between the first surface and the fifth fin end in the first direction. The fifth distance is longer than the first distance.

With the disc brake pad according to the twenty-first aspect, the fifth fin can efficiently increase the surface area of the disc brake pad while reducing or preventing unnecessary contact between the caliper body and the fifth fin.

In accordance with a twenty-second aspect of the present invention, the disc brake pad according to the twenty-first aspect is configured so that the fifth distance is equal to the fourth distance.

With the disc brake pad according to the twenty-second aspect, the fourth fin and the fifth fin can efficiently increase the surface area of the disc brake pad while reducing or preventing unnecessary contact between the caliper body and the fourth fin and the fifth fin.

In accordance with a twenty-third aspect of the present invention, the disc brake pad according to any one of the first to twenty-second aspects further comprises an additional plate attached to the base plate. The base plate includes a second surface provided on a reverse side of the first surface. The additional plate is provided on the second surface.

With the disc brake pad according to the twenty-third aspect, it is possible to couple the friction pad to the base plate using the additional plate.

In accordance with a twenty-fourth aspect of the present invention, the disc brake pad according to any one of the first to twenty-third aspects is configured so that the first fin protrudes from the base plate away from the friction pad. The second fin protrudes from the base plate away from the friction pad.

With the disc brake pad according to the twenty-fourth aspect, it is possible to utilize a space provided on a reverse side of the friction pad as a space where the first fin and the second fin are provided.

In accordance with a twenty-fifth aspect of the present invention, a disc brake caliper comprises a caliper body and the disc brake pad according to any one of the first to twenty-fourth aspects. The caliper body is configured to be mounted to a vehicle body of a human-powered vehicle. The disc brake pad is movable relative to the caliper body in the first direction.

With the disc brake pad according to the twenty-fifth aspect, it is possible to apply the structure of the disc brake pad to the disc brake caliper. Thus, it is possible to effectively discharge heat generated by sliding between the friction pad and a disc brake rotor while enabling the disc brake pad to move smoothly.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
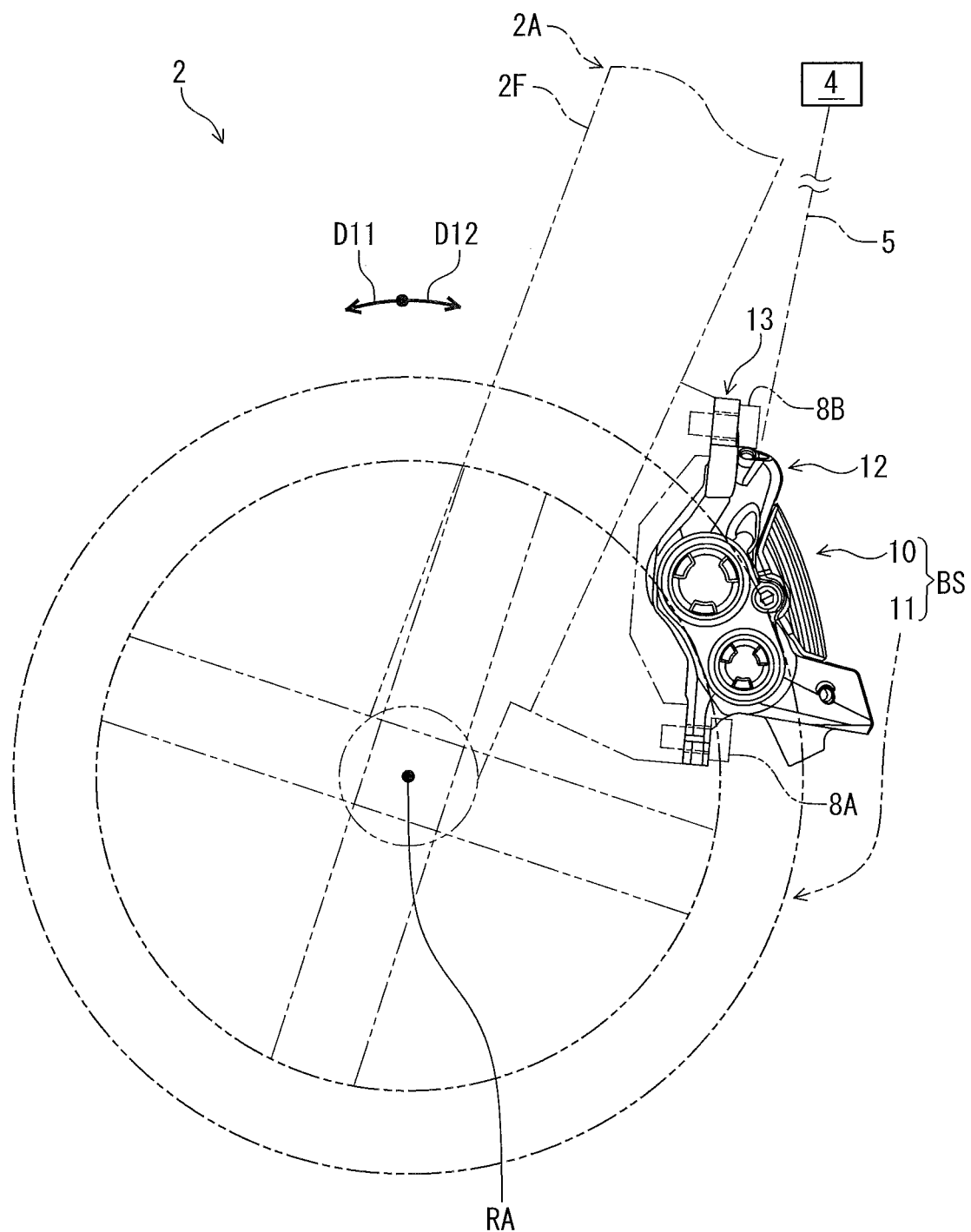
FIG. 1 is a side elevational view of a human-powered vehicle including a disc brake caliper in accordance with one of embodiments.

The embodiments will now be described with reference to the accompanying drawings, wherein like reference numerals designate corresponding or identical elements throughout the various drawings.

As seen in FIG. 1, a brake system BS of a human-powered vehicle 2 is configured to be connected to an operating device 4 via a hydraulic hose 5. The brake system BS of the human-powered vehicle 2 comprises a disc brake caliper 10 and a disc brake rotor 11. The operating device 4 is configured to supply a hydraulic pressure to the disc brake caliper 10. The disc brake caliper 10 is configured to apply a braking force to the disc brake rotor 11 in response to the hydraulic pressure supplied from the operating device 4. The disc brake rotor 11 is rotatably coupled to a vehicle body 2A about a rotational axis RA. The disc brake rotor 11 is rotatable relative to the disc brake caliper 10 about the rotational axis RA.

The disc brake rotor 11 rotates relative to the vehicle body 2A in a driving rotational direction D11 while the human-powered vehicle 2 moves forward. The disc brake rotor 11 rotates relative to the vehicle body 2A in an opposite rotational direction D12 while the human-powered vehicle 2 moves backward. The opposite rotational direction D12 is an opposite direction of the driving rotational direction D11.

In the present application, the term "human-powered vehicle" includes a vehicle to travel with a motive power including at least a human power of a user who rides the vehicle. The human-powered vehicle includes a various kind of bicycles such as a mountain bike, a road bike, a city bike, a cargo bike, a hand bike, and a recumbent bike. Furthermore, the human-powered vehicle includes an electric bike called as an E-bike. The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only a driving source as motive power. Examples of the driving source include an internal-combustion engine and an electric motor. Generally, a light road vehicle, which includes a vehicle that does not require a driver's license for a public road, is assumed as the human-powered vehicle.

As seen in FIG. 1, the disc brake caliper 10 comprises a caliper body 12. The caliper body 12 is configured to be mounted to the vehicle body 2A of the human-powered vehicle 2. The caliper body 12 is configured to be coupled to the vehicle body 2A with fasteners 8A and 8B such as screws. The caliper body 12 is configured to be detachably and reattachably coupled to the vehicle body 2A with the fasteners 8A and 8B. For example, the caliper body 12 is configured to be mounted to a front fork 2F of the vehicle body 2A. However, the disc brake caliper 10 can be mounted to other parts (e.g., a chain stay or a seat stay) of the vehicle body 2A if needed or desired.

In the present application, the following directional terms "front," "rear," "forward," "rearward," "left," "right," "transverse," "upward" and "downward" as well as any other similar directional terms refer to those directions which are determined on the basis of the user who is in the user's standard position in the human-powered vehicle 2 with facing a handlebar or steering. Examples of the user's standard position include a saddle and a seat. Accordingly, these terms, as utilized to describe the disc brake caliper 10 or other components, should be interpreted relative to the human-powered vehicle 2 equipped with the disc brake caliper 10 or other components as used in an upright riding position on a horizontal surface.

The term "detachably and reattachably," as used herein, encompasses a configuration in which an element is repeatedly detachable from and attachable to another element without substantial damage.

Figure 2:
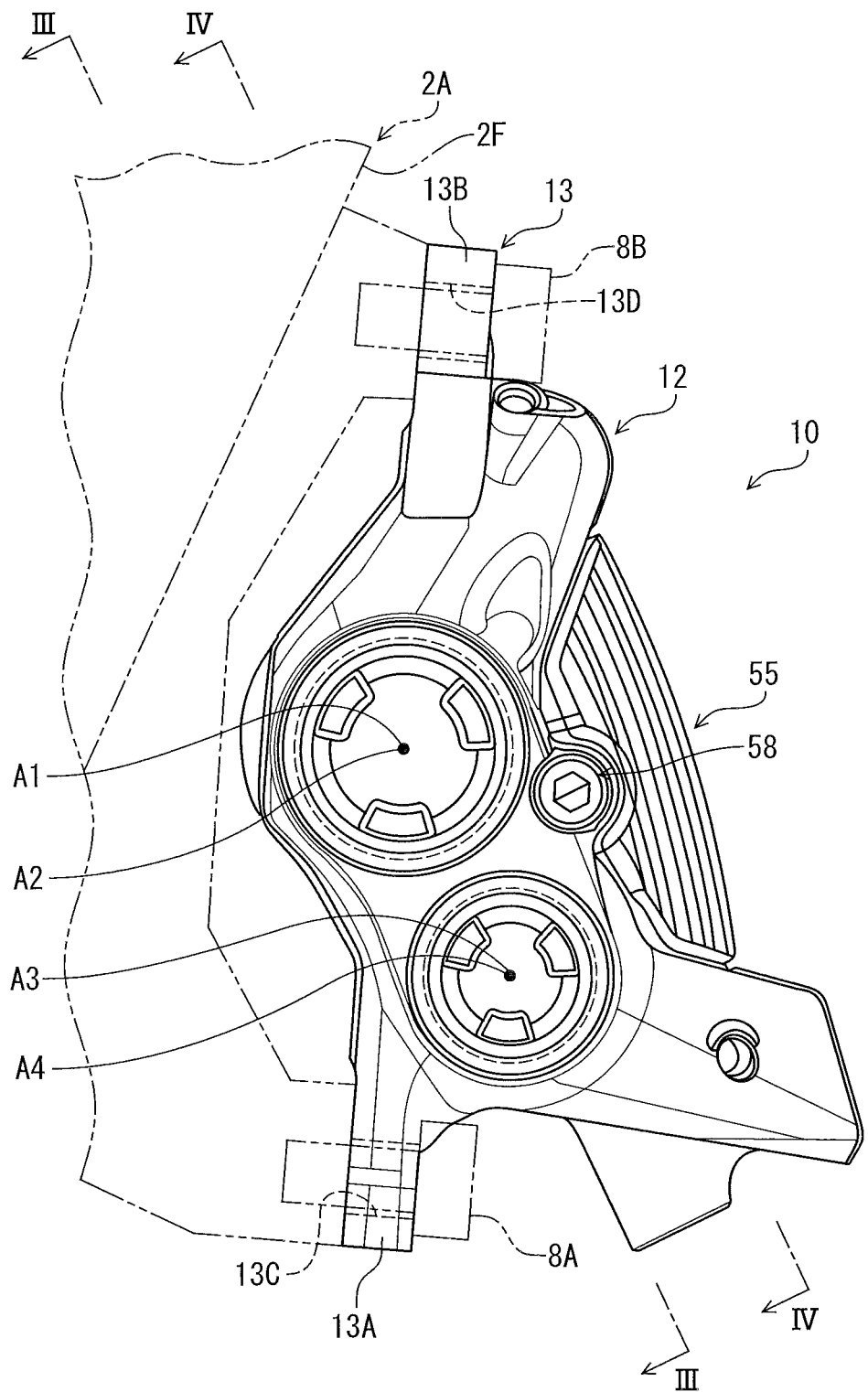
FIG. 2 is a side elevational view of the disc brake caliper illustrated in FIG. 1.

As seen in FIG. 2, the disc brake caliper 10 of the human-powered vehicle 2 comprises a coupling portion 13. The coupling portion 13 is configured to couple the caliper body 12 and the vehicle body 2A of the human-powered vehicle 2.

The coupling portion 13 includes a first coupling portion 13A and a second coupling portion 13B. The second coupling portion 13B is spaced apart from the first coupling portion 13A. The first coupling portion 13A protrudes from the caliper body 12 away from the second coupling portion 13B. The second coupling portion 13B protrudes from the caliper body 12 away from the first coupling portion 13A.

The first coupling portion 13A includes a first coupling hole 13C. The second coupling portion 13B includes a second coupling hole 13D. The fastener 8A extends through the first coupling hole 13C in a coupling state where the caliper body 12 is mounted to the vehicle body 2A. The fastener 8B extends through the second coupling hole 13D in the coupling state. However, the structure of the coupling portion 13 is not limited to the illustrated embodiment.

Figure 3:
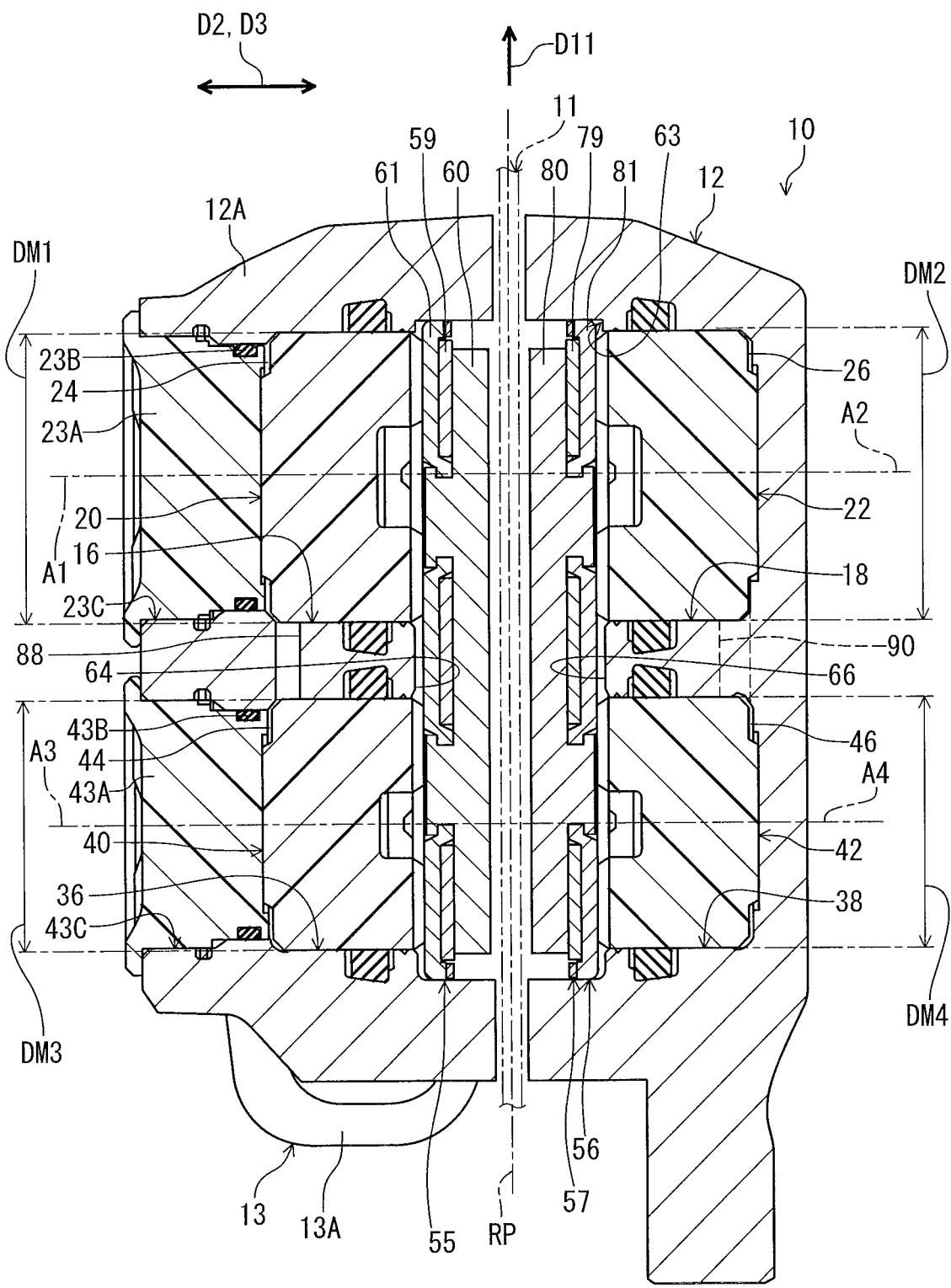
FIG. 3 is a cross-sectional view of the disc brake caliper taken along line III-III of FIG. 2.

As seen in FIG. 3, the caliper body 12 includes a first piston space 16. The disc brake caliper 10 includes a first piston 20. The caliper body 12 includes a second piston space 18. The first piston 20 is movably provided in the first piston space 16. The disc brake caliper 10 includes a second piston 22. The second piston 22 is movably provided in the second piston space 18.

The first piston 20 has a first center axis A1 and is movable relative to the caliper body 12 along the first center axis A1. The second piston 22 has a second center axis A2 and is movable relative to the caliper body 12 along the second center axis A2.

In the present embodiment, the caliper body 12 includes a main body 12A, a cap 23A, a seal member 23B, and a hole 23C. The cap 23A is coupled to the main body 12A to close the hole 23C. The cap 23A is threadedly engaged with the hole 23C. The main body 12A and the cap 23A define the first piston space 16. The seal member 23B is provided between the main body 12A and the cap 23A.

The caliper body 12 and the first piston 20 define a first hydraulic chamber 24 in the first piston space 16. The caliper body 12 and the second piston 22 define a second hydraulic chamber 26 in the second piston space 18.

The first center axis A1 extends through the second piston space 18. The second center axis A2 extends through the first piston space 16. In the present embodiment, the first center axis A1 is coincident with the second center axis A2. However, the first center axis A1 can be offset from the second center axis A2 if needed or desired.

As seen in FIG. 3, the caliper body 12 includes a third piston space 36 and a fourth piston space 38. The disc brake caliper 10 further comprises a third piston 40 and a fourth piston 42. The third piston 40 is movably provided in the third piston space 36. The fourth piston 42 is movably provided in the fourth piston space 38.

The third piston 40 has a third center axis A3 and is movable relative to the caliper body 12 along the third center axis A3. The fourth piston 42 has a fourth center axis A4 and is movable relative to the caliper body 12 along the fourth center axis A4.

In the present embodiment, the caliper body 12 includes a cap 43A, a seal member 43B, and a hole 43C. The cap 43A is coupled to the main body 12A to close the hole 43C. The cap 43A is threadedly engaged with the hole 43C. The main body 12A and the cap 43A define the third piston space 36. The seal member 43B is provided between the main body 12A and the cap 43A.

The caliper body 12 and the third piston 40 define a third hydraulic chamber 44 in the third piston space 36. The caliper body 12 and the fourth piston 42 define a fourth hydraulic chamber 46 in the fourth piston space 38.

The third center axis A3 extends through the fourth piston space 38. The fourth center axis A4 extends through the third piston space 36. In the present embodiment, the third center axis A3 is coincident with the fourth center axis A4. However, the third center axis A3 can be offset from the fourth center axis A4 if needed or desired.

As seen in FIG. 3, the first piston 20 has a first outer diameter DM1. The second piston 22 has a second outer diameter DM2. The third piston 40 has a third outer diameter DM3. The fourth piston 42 has a fourth outer diameter DM4. In the present embodiment, the second outer diameter DM2 is equal to the first outer diameter DM1. The fourth outer diameter DM4 is equal to the third outer diameter DM3. The first outer diameter DM1 is larger than the third outer diameter DM3 and the fourth outer diameter DM4. The second outer diameter DM2 is larger than the third outer diameter DM3 and the fourth outer diameter DM4. However, the second outer diameter DM2 can be different from the first outer diameter DM1 if needed or desired. The fourth outer diameter DM4 can be different from the third outer diameter DM3 if needed or desired. The first outer diameter DM1 can be smaller than or equal to at least one of the third outer diameter DM3 and the fourth outer diameter DM4 if needed or desired. The second outer diameter DM2 can be smaller than or equal to at least one of the third outer diameter DM3 and the fourth outer diameter DM4 if needed or desired.

In the present embodiment, the main body 12A of the caliper body 12 is integrally provided as a one-piece unitary member. However, the main body 12A can be at least two separate members if needed or desired.

As seen in FIG. 3, the disc brake caliper 10 comprises a disc brake pad 55. The disc brake pad 55 is movable relative to the caliper body 12. The disc brake pad 55 is movable relative to the caliper body 12 in an axial direction D2. The axial direction D2 is defined along the first center axis A1. The disc brake pad 55 is contactable with the disc brake rotor 11.

The disc brake caliper 10 comprises a disc brake pad 56. The disc brake pad 56 is movable relative to the caliper body 12. The disc brake pad 56 is movable relative to the caliper body 12 in the axial direction D2. The disc brake pad 56 is contactable with the disc brake rotor 11.

In the present embodiment, the disc brake pads 55 and 56 have shapes symmetrical with respect to a reference plane RP perpendicular to the axial direction D2. However, the disc brake pads 55 and 56 can have shapes asymmetrical with respect to the reference plane RP if needed or desired.

Figure 4:
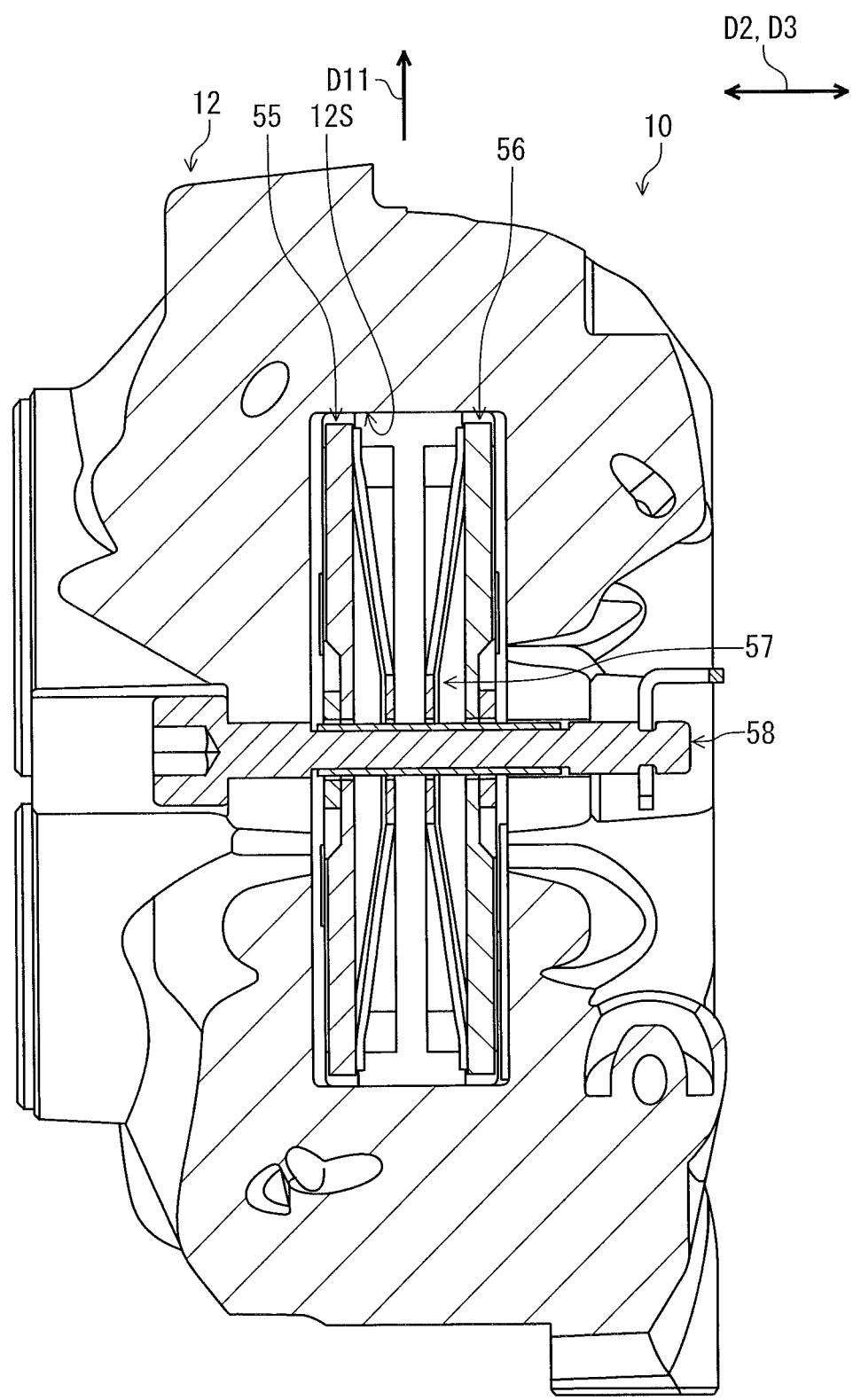
FIG. 4 is a cross-sectional view of the disc brake caliper taken along line IV-IV of FIG. 2.

As seen in FIG. 4, the caliper body 12 includes a pad space 12S. The disc brake pad 55 is movably provided in the pad space 12S. The disc brake pad 56 is movably provided in the pad space 12S.

The disc brake caliper 10 includes a biasing member 57. The biasing member 57 is configured to bias the disc brake pad 55 away from the disc brake pad 56. The biasing member 57 is configured to bias the disc brake pad 56 away from the disc brake pad 55. The biasing member 57 is provided between the disc brake pad 55 and the disc brake pad 56.

The disc brake caliper 10 includes a pad axle 58. The pad axle 58 is coupled to the caliper body 12 to support movably the disc brake pad 55 and the disc brake pad 56. The pad axle 58 is coupled to the caliper body 12 to support movably the biasing member 57.

Figure 5:
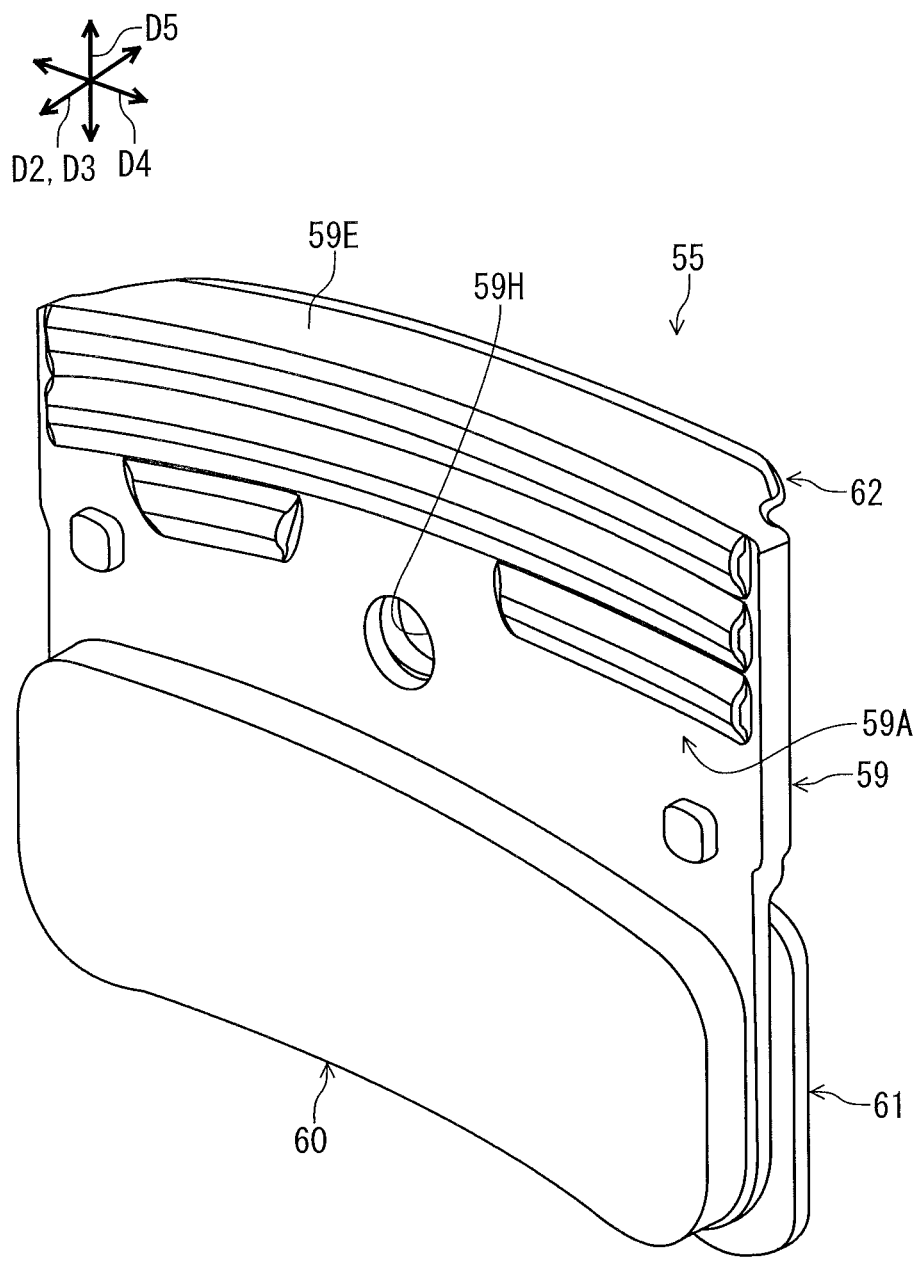
FIG. 5 is a perspective view of a disc brake pad of the disc brake caliper illustrated in FIG. 2.
Figure 6:
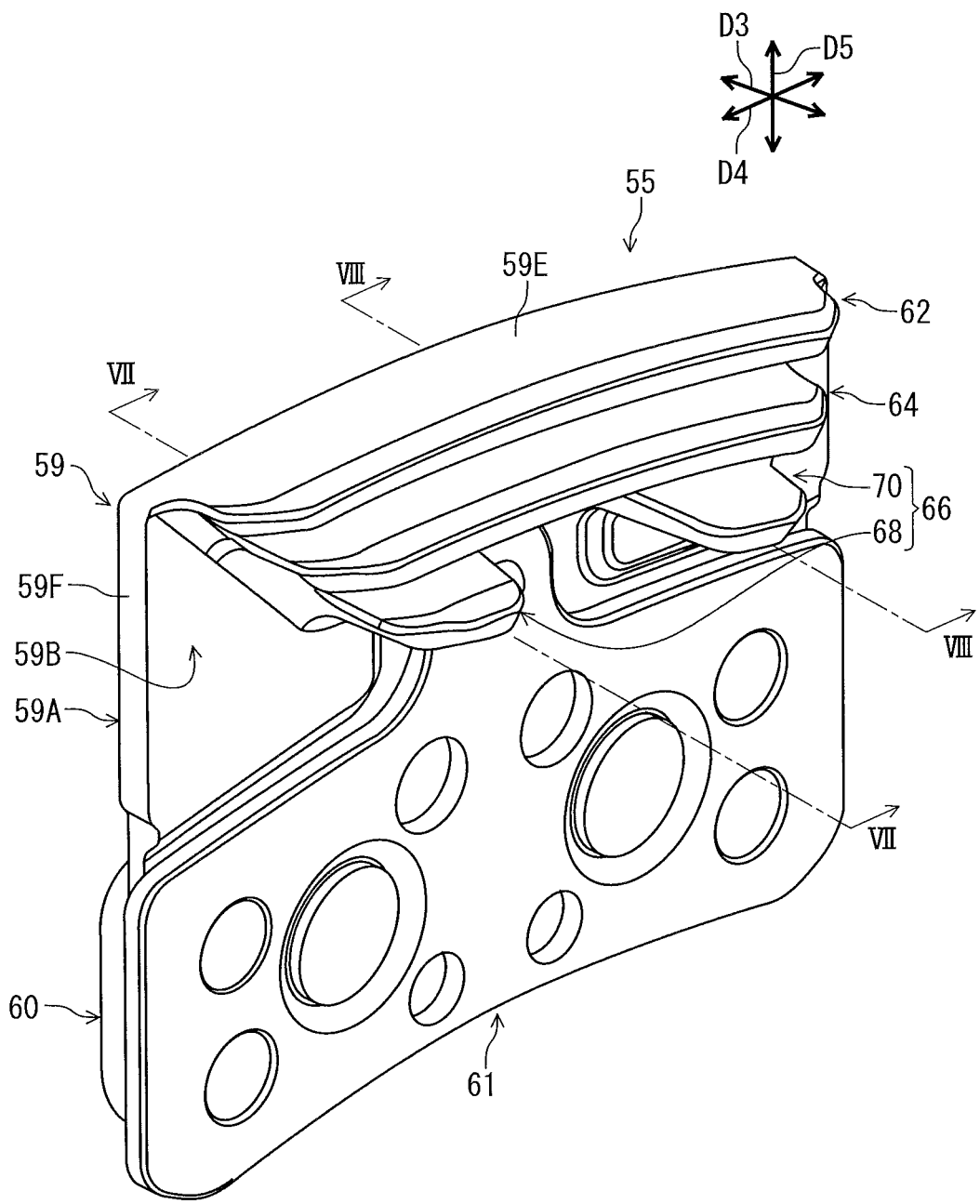
FIG. 6 is another perspective view of the disc brake pad of the disc brake caliper illustrated in FIG. 2.

As seen in FIGS. 5 and 6, the disc brake pad 55 comprises a base plate 59 and a friction pad 60. The disc brake pad 55 further comprises an additional plate 61. The friction pad 60 is attached to the base plate 59. The additional plate 61 is attached to the base plate 59. As seen in FIG. 4, the friction pad 60 is contactable with the disc brake rotor 11. The additional plate 61 is contactable with the first piston 20 and the third piston 40.

Figure 7:
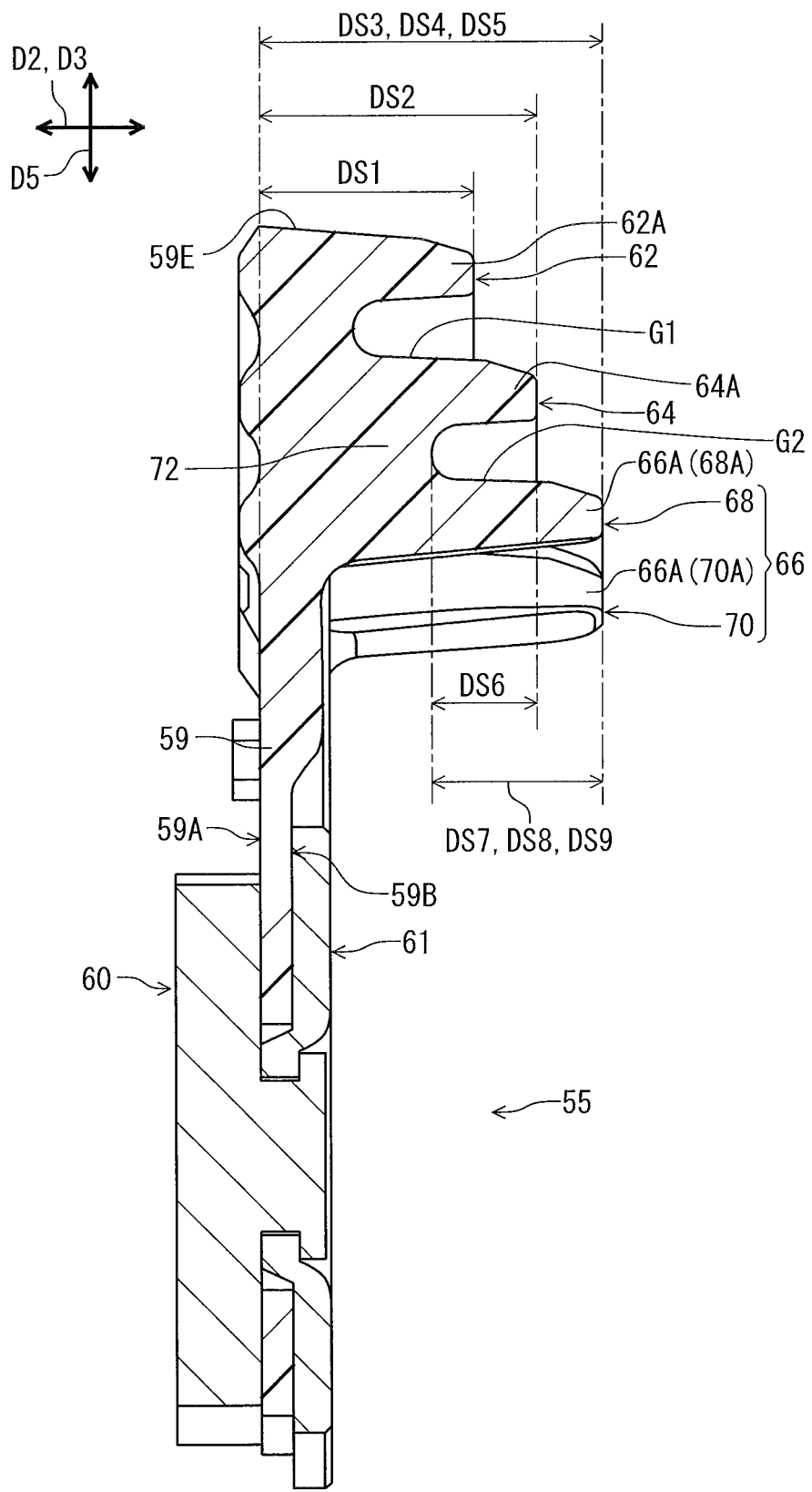
FIG. 7 is a cross-sectional view of the disc brake pad taken along line VII-VII of FIG. 6.

As seen in FIG. 7, the base plate 59 includes a first surface 59A. The base plate 59 includes a second surface 59B provided on a reverse side of the first surface 59A. The friction pad 60 is provided on the first surface 59A. The additional plate 61 is provided on the second surface 59B.

The first surface 59A includes a flat surface. The second surface 59B includes a flat surface. However, the first surface 59A can include shapes other than a flat shape if needed or desired. The second surface 59B can include shapes other than a flat shape if needed or desired.

As seen in FIG. 6, the disc brake pad 55 comprises a first fin 62 and a second fin 64. The first fin 62 protrudes from the base plate 59 to increase a surface area of the disc brake pad 55. The second fin 64 protrudes from the base plate 59 to increase the surface area of the disc brake pad 55.

In the present embodiment, the disc brake pad 55 further comprises a third fin 66. The third fin 66 protrudes from the base plate 59 to increase the surface area of the disc brake pad 55. However, the third fin 66 can be omitted from the disc brake pad 55 if needed or desired.

In the present embodiment, the third fin 66 includes a fourth fin 68 and a fifth fin 70. The fourth fin 68 is spaced apart from the fifth fin 70. The fourth fin 68 protrudes from the base plate 59 to increase the surface area of the disc brake pad 55. The fifth fin 70 protrudes from the base plate 59 to increase the surface area of the disc brake pad 55. However, at least one of the fourth fin 68 and the fifth fin 70 can be omitted from the disc brake pad 55 if needed or desired.

Figure 8:
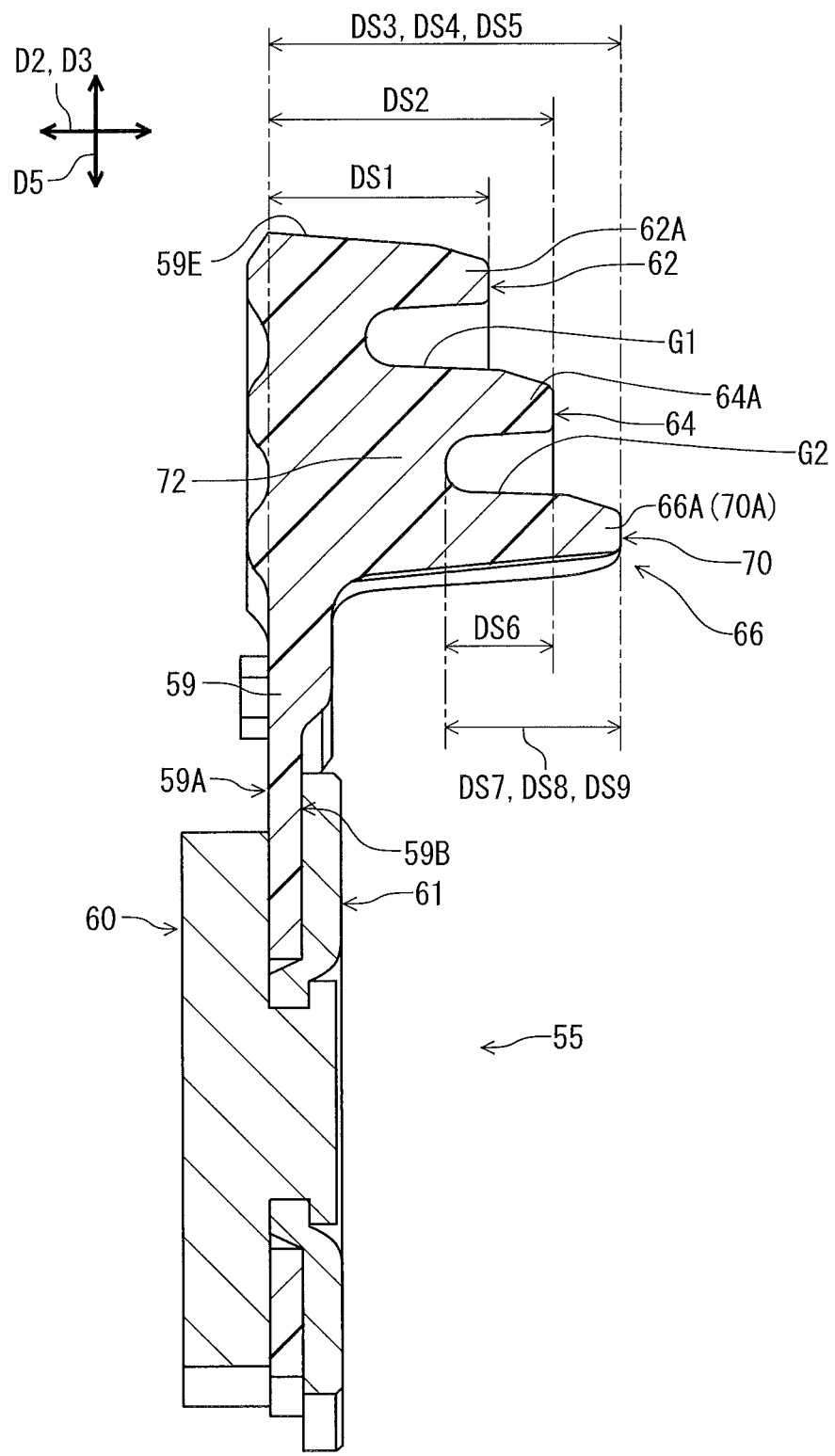
FIG. 8 is a cross-sectional view of the disc brake pad taken along line VIII-VIII of FIG. 6.

As seen in FIGS. 7 and 8, the first fin 62 includes a first fin end 62A and protrudes from the base plate 59 to the first fin end 62A in a first direction D3. The second fin 64 includes a second fin end 64A and protrudes from the base plate 59 to the second fin end 64A in the first direction D3. The third fin 66 includes a third fin end 66A and protrudes from the base plate 59 to the third fin end 66A in the first direction D3. The fourth fin 68 includes a fourth fin end 68A and protrudes from the first surface 59A to the fourth fin end 68A in the first direction D3. The fifth fin 70 includes a fifth fin end 70A and protrudes from the first surface 59A to the fifth fin end 70A in the first direction D3.

In the present embodiment, the first direction D3 is defined along the axial direction D2. The first direction D3 is parallel to the axial direction D2. However, the first direction D3 can be non-parallel to the axial direction D2 if needed or desired. The first direction D3 can intersect the axial direction D2 if needed or desired.

As seen in FIGS. 7 and 8, the first fin 62 protrudes from the base plate 59 away from the friction pad 60. The second fin 64 protrudes from the base plate 59 away from the friction pad 60. The third fin 66 protrudes from the base plate 59 away from the friction pad 60. The fourth fin 68 protrudes from the base plate 59 away from the friction pad 60. The fifth fin 70 protrudes from the base plate 59 away from the friction pad 60.

The first fin 62 protrudes from the second surface 59B away from the friction pad 60 in the first direction D3. The second fin 64 protrudes from the second surface 59B away from the friction pad 60 in the first direction D3. The third fin 66 protrudes from the second surface 59B away from the friction pad 60 in the first direction D3. The fourth fin 68 protrudes from the second surface 59B away from the friction pad 60 in the first direction D3. The fifth fin 70 protrudes from the second surface 59B away from the friction pad 60 in the first direction D3.

However, the positional relationship between the first fin 62 and the friction pad 60 is not limited to the illustrated embodiment. The positional relationship between the second fin 64 and the friction pad 60 is not limited to the illustrated embodiment. The positional relationship between the third fin 66 and the friction pad 60 is not limited to the illustrated embodiment. The positional relationship between the fourth fin 68 and the friction pad 60 is not limited to the illustrated embodiment. The positional relationship between the fifth fin 70 and the friction pad 60 is not limited to the illustrated embodiment.

As seen in FIGS. 7 and 8, the first fin 62 has a first distance DS1 defined between the first surface 59A and the first fin end 62A in the first direction D3. The second fin 64 has a second distance DS2 defined between the first surface 59A and the second fin end 64A in the first direction D3. The second distance DS2 is longer than the first distance DS1. The second fin end 64A of the second fin 64 is provided entirely father from the first surface 59A than the first fin end 62A of the first fin 62 in the first direction D3.

The third fin 66 has a third distance DS3 defined between the first surface 59A and the third fin end 66A in the first direction D3. In the present embodiment, the third distance DS3 is longer than the first distance DS1. The third distance DS3 is longer than the second distance DS2. The third fin end 66A of the third fin 66 is provided entirely father from the first surface 59A than the first fin end 62A of the first fin 62 in the first direction D3. The third fin end 66A is provided entirely father from the first surface 59A than the second fin end 64A of the second fin 64 in the first direction D3. However, the third distance DS3 can be equal to or shorter than at least one of the first distance DS1 and the second distance DS2 if needed or desired.

As seen in FIG. 7, the fourth fin 68 has a fourth distance DS4 defined between the first surface 59A and the fourth fin end 68A in the first direction D3. In the present embodiment, the fourth distance DS4 is longer than the first distance DS1. The fourth distance DS4 is longer than the second distance DS2. The fourth fin end 68A of the fourth fin 68 is provided entirely father from the first surface 59A than the first fin end 62A of the first fin 62 in the first direction D3. The fourth fin end 68A is provided entirely father from the first surface 59A than the second fin end 64A of the second fin 64 in the first direction D3. However, the fourth distance DS4 can be equal to or shorter than at least one of the first distance DS1 and the second distance DS2 if needed or desired.

As seen in FIG. 8, the fifth fin 70 has a fifth distance DS5 defined between the first surface 59A and the fifth fin end 70A in the first direction D3. In the present embodiment, the fifth distance DS5 is longer than the first distance DS1. The fifth distance DS5 is equal to the fourth distance DS4. The fifth distance DS5 is longer than the second distance DS2. The fifth fin end 70A of the fifth fin 70 is provided entirely father from the first surface 59A than the first fin end 62A of the first fin 62 in the first direction D3. The fifth fin end 70A is provided entirely father from the first surface 59A than the second fin end 64A of the second fin 64 in the first direction D3. However, the fifth distance DS5 can be equal to or shorter than at least one of the first distance DS1 and the second distance DS2 if needed or desired.

As seen in FIG. 7, the fourth distance DS4 is equal to the fifth distance DS5. However, the fourth distance DS4 can be different from the fifth distance DS5 if needed or desired.

As seen in FIGS. 7 and 8, the disc brake pad 55 further comprises an additional base part 72. The additional base part 72 is provided between the second fin 64 and the third fin 66 as viewed in the first direction D3. The second fin 64 protrudes from the additional base part 72 to the second fin end 64A in the first direction D3. The third fin 66 protrudes from the additional base part 72 to the third fin end 66A in the first direction D3. The second fin 64 has a second additional distance DS6 defined between the additional base part 72 and the second fin end 64A in the first direction D3. The third fin 66 has a third additional distance DS7 defined between the additional base part 72 and the third fin end 66A in the first direction D3. The third additional distance DS7 is different from the second additional distance DS6. The third additional distance DS7 is longer than the second additional distance DS6. However, the third additional distance DS7 can be equal to or shorter than the second additional distance DS6 if needed or desired.

The fourth fin 68 has a fourth additional distance DS8 defined between the additional base part 72 and the fourth fin end 68A in the first direction D3. The fourth additional distance DS8 is different from the second additional distance DS6. The fourth additional distance DS8 is longer than the second additional distance DS6. However, the fourth additional distance DS8 can be equal to or shorter than the second additional distance DS6 if needed or desired.

The fifth fin 70 has a fifth additional distance DS9 defined between the additional base part 72 and the fifth fin end 70A in the first direction D3. The fifth additional distance DS9 is different from the second additional distance DS6. The fifth additional distance DS9 is longer than the second additional distance DS6. However, the fifth additional distance DS9 can be equal to or shorter than the second additional distance DS6 if needed or desired.

A first groove G1 is defined between the first fin 62 and the second fin 64. The second groove G2 is defined between the second fin 64 and the third fin 66. The second groove G2 is partially provided between the second fin 64 and the fourth fin 68. The second groove G2 is partially provided between the second fin 64 and the fifth fin 70.

Figure 9:
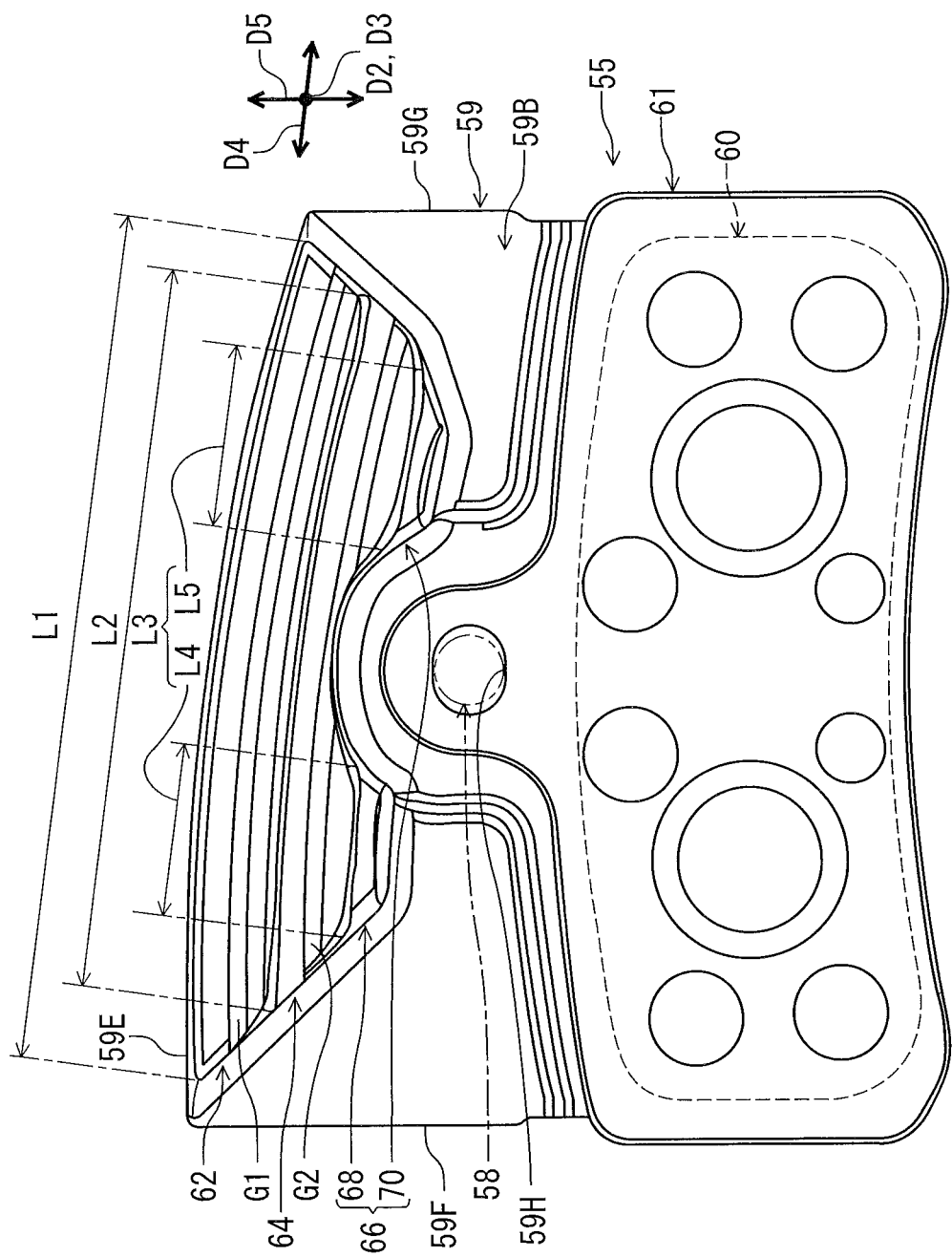
FIG. 9 is a side elevational view of the disc brake pad illustrated in FIG. 5.

As seen in FIG. 9, the base plate 59 includes a first edge 59E. The first fin 62 extends along a first edge 59E of the base plate 59. The first fin 62 extends in a second direction D4. The first edge 59E extends along the second direction D4. The second fin 64 extends in the second direction D4. The third fin 66 extends in the second direction D4. The fourth fin 68 extends in the second direction D4. The fifth fin 70 extends in the second direction D4. The first groove G1 extends in the second direction D4. The second groove G2 extends in the second direction D4.

Figure 10:
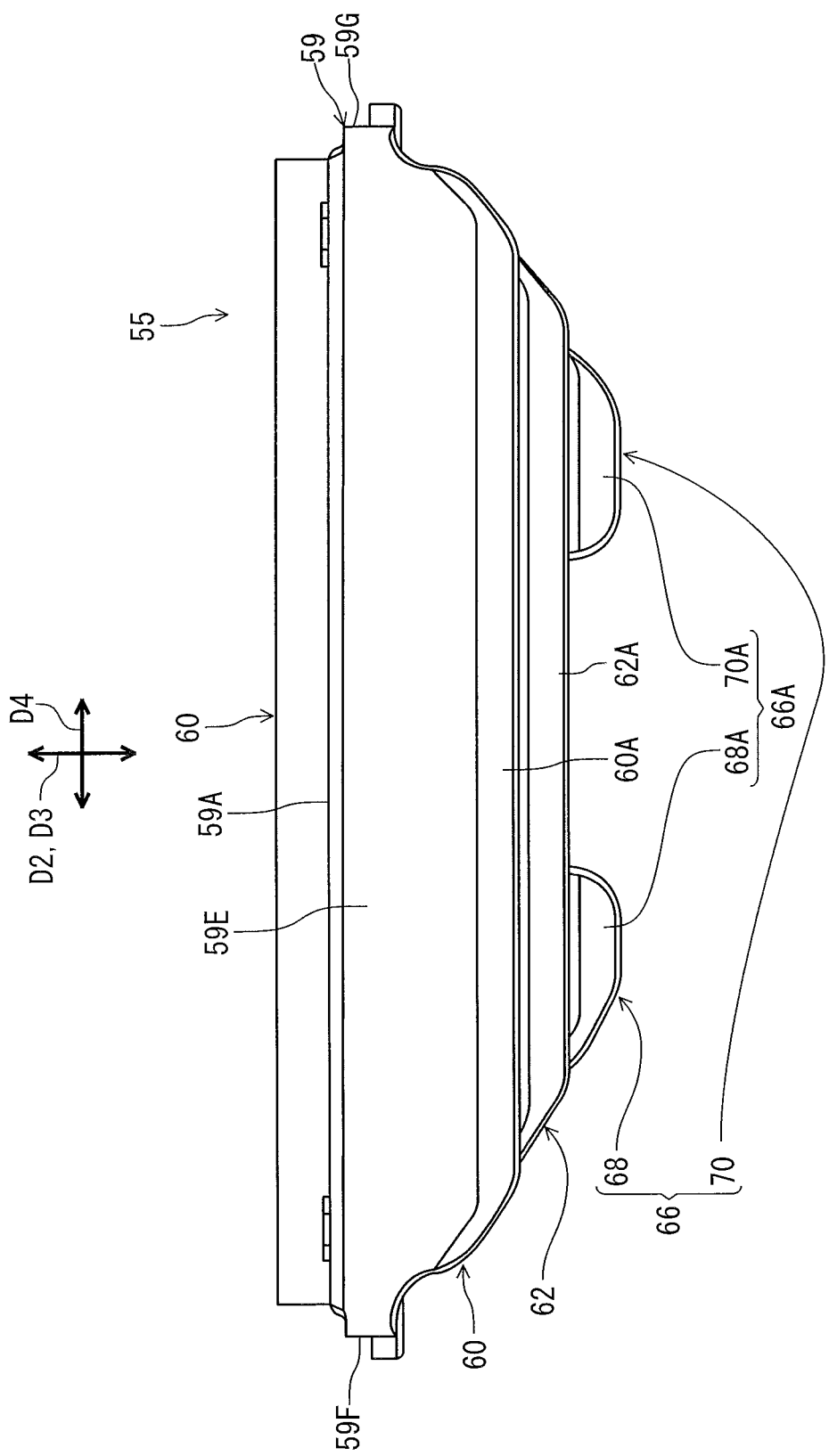
FIG. 10 is a top elevational view of the disc brake pad illustrated in FIG. 5.

As seen in FIG. 10, the second direction D4 is defined along the first surface 59A. The second direction D4 intersects the first direction D3. The second direction D4 is perpendicular to the first direction D3. However, the second direction D4 can be non-perpendicular to the first direction D3 if needed or desired.

As seen in FIG. 9, the base plate 59 includes a second edge 59F and a third edge 59G. The second edge 59F extends from the first edge 59E along a third direction D5. The third edge 59G extends from the first edge 59E along the third direction D5. The second edge 59F is spaced apart from the third edge 59G. The third direction D5 is perpendicular to the first direction D3. The third direction D5 intersects the second direction D4. The third direction D5 is non-perpendicular to the second direction D4. However, the third direction D5 can be perpendicular to the second direction D4 if needed or desired.

The first fin 62 is at least partially provided between the second edge 59F and the third edge 59G as viewed in the first direction D3. The second fin 64 is at least partially provided between the second edge 59F and the third edge 59G as viewed in the first direction D3. The third fin 66 is at least partially provided between the second edge 59F and the third edge 59G as viewed in the first direction D3. The fourth fin 68 is at least partially provided between the second edge 59F and the third edge 59G as viewed in the first direction D3. The fifth fin 70 is at least partially provided between the second edge 59F and the third edge 59G as viewed in the first direction D3.

In the present embodiment, the first fin 62 is entirely provided between the second edge 59F and the third edge 59G as viewed in the first direction D3. The second fin 64 is entirely provided between the second edge 59F and the third edge 59G as viewed in the first direction D3. The third fin 66 is entirely provided between the second edge 59F and the third edge 59G as viewed in the first direction D3. The fourth fin 68 is entirely provided between the second edge 59F and the third edge 59G as viewed in the first direction D3. The fifth fin 70 is entirely provided between the second edge 59F and the third edge 59G as viewed in the first direction D3.

However, the first fin 62 can be partially provided between the second edge 59F and the third edge 59G as viewed in the first direction D3 if needed or desired. The second fin 64 can be partially provided between the second edge 59F and the third edge 59G as viewed in the first direction D3 if needed or desired. The third fin 66 can be partially provided between the second edge 59F and the third edge 59G as viewed in the first direction D3 if needed or desired. The fourth fin 68 can be partially provided between the second edge 59F and the third edge 59G as viewed in the first direction D3 if needed or desired. The fifth fin 70 can be partially provided between the second edge 59F and the third edge 59G as viewed in the first direction D3 if needed or desired.

As seen in FIG. 9, the first fin 62 has a first length L1 defined in the second direction D4. The second fin 64 has a second length L2 defined in the second direction D4. The third fin 66 has a third length L3 defined in the second direction D4. The fourth fin 68 has a fourth length L4 defined in the second direction D4. The fifth fin 70 has a fifth length L5 defined in the second direction D4. The third length L3 is a total of the fourth length L4 and the fifth length L5.

In the present embodiment, the first length L1 is different from the second length L2. The first length L1 is different from each of the second length L2 and the third length L3. The second length L2 is different from the third length L3. The first length L1 is different from each of the fourth length L4 and the fifth length L5. The second length L2 is different from each of the fourth length L4 and the fifth length L5.

The first length L1 is longer than the second length L2. The first length L1 is longer than each of the second length L2 and the third length L3. The second length L2 is longer than the third length L3. The first length L1 is longer than each of the fourth length L4 and the fifth length L5. The second length L2 is longer than each of the fourth length L4 and the fifth length L5. However, the first length L1 can be equal to or shorter than at least one of the second length L2 and the third length L3 if needed or desired. The second length L2 can be equal to or shorter than the third length L3 if needed or desired.

As seen in FIG. 9, the second fin 64 is provided closer to the friction pad 60 than the first fin 62 as viewed in the first direction D3. The third fin 66 is provided closer to the friction pad 60 than the first fin 62 and the second fin 64 as viewed in the first direction D3. The second fin 64 is at least partially provided between the first fin 62 and the third fin 66. In the present embodiment, the second fin 64 is entirely provided between the first fin 62 and the third fin 66. However, the second fin 64 can be partially provided between the first fin 62 and the third fin 66 if needed or desired.

The base plate 59 includes a hole 59H. The pad axle 58 extends through the hole 59H in a state where the pad axle 58 movably supports the disc brake pad 55. The first fin 62 is spaced apart from the hole 59H. The second fin 64 is spaced apart from the hole 59H. The third fin 66 is spaced apart from the hole 59H. The fourth fin 68 and the fifth fin 70 are spaced apart from the hole 59H. The second fin 64 is provided between the first fin 62 and the hole 59H as viewed in the first direction D3.

As seen in FIG. 3, the disc brake pad 55 is movable relative to the caliper body 12 in the first direction D3. The disc brake pad 55 is movable relative to the caliper body 12 in the axial direction D2. The disc brake pad 56 is movable relative to the caliper body 12 in the first direction D3. The disc brake pad 56 is movable relative to the caliper body 12 in the axial direction D2. However, the disc brake pad 55 can be configured to be movable relative to the caliper body 12 in a direction intersecting at least one of the first direction D3 and the axial direction D2 if needed or desired. The disc brake pad 56 can be configured to be movable relative to the caliper body 12 in a direction intersecting at least one of the first direction D3 and the axial direction D2 if needed or desired.

Figure 11:
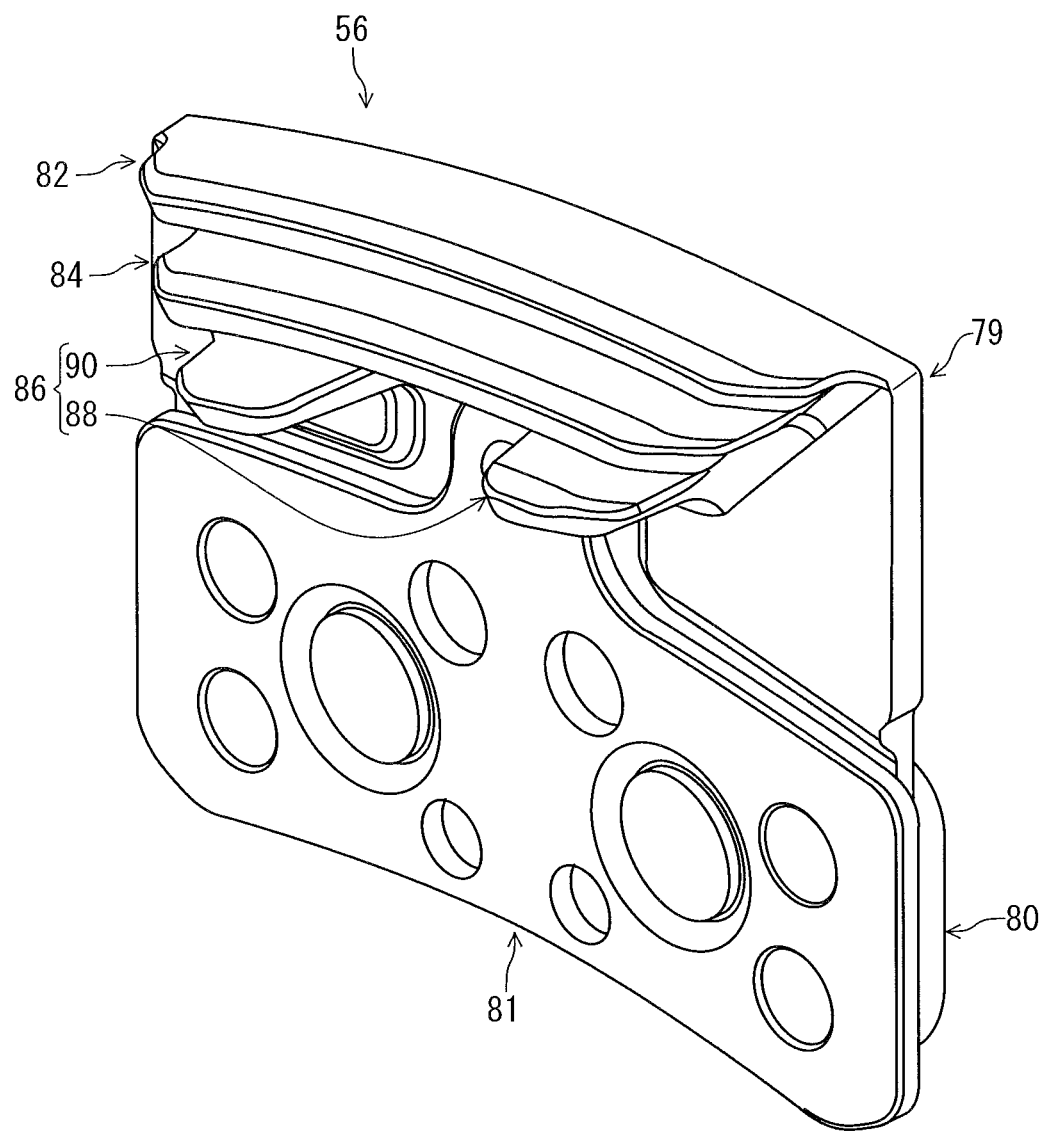
FIG. 11 is a perspective view of another disc brake pad of the disc brake caliper illustrated in FIG. 2.

As seen in FIG. 11, the disc brake pad 56 includes a base plate 79, a friction pad 80, an additional plate 81, a first fin 82, a second fin 84, and a third fin 86. The third fin includes a fourth fin 88 and a fifth fin 90. The disc brake pad 56 has substantially the same structure as the disc brake pad 55 except that the disc brake pad 56 has a symmetrical shape with the disc brake pad 55 with respect to the reference plane RP (see e.g., FIG. 3). Thus, they will not be described in detail here for the sake of brevity.

Figure 12:
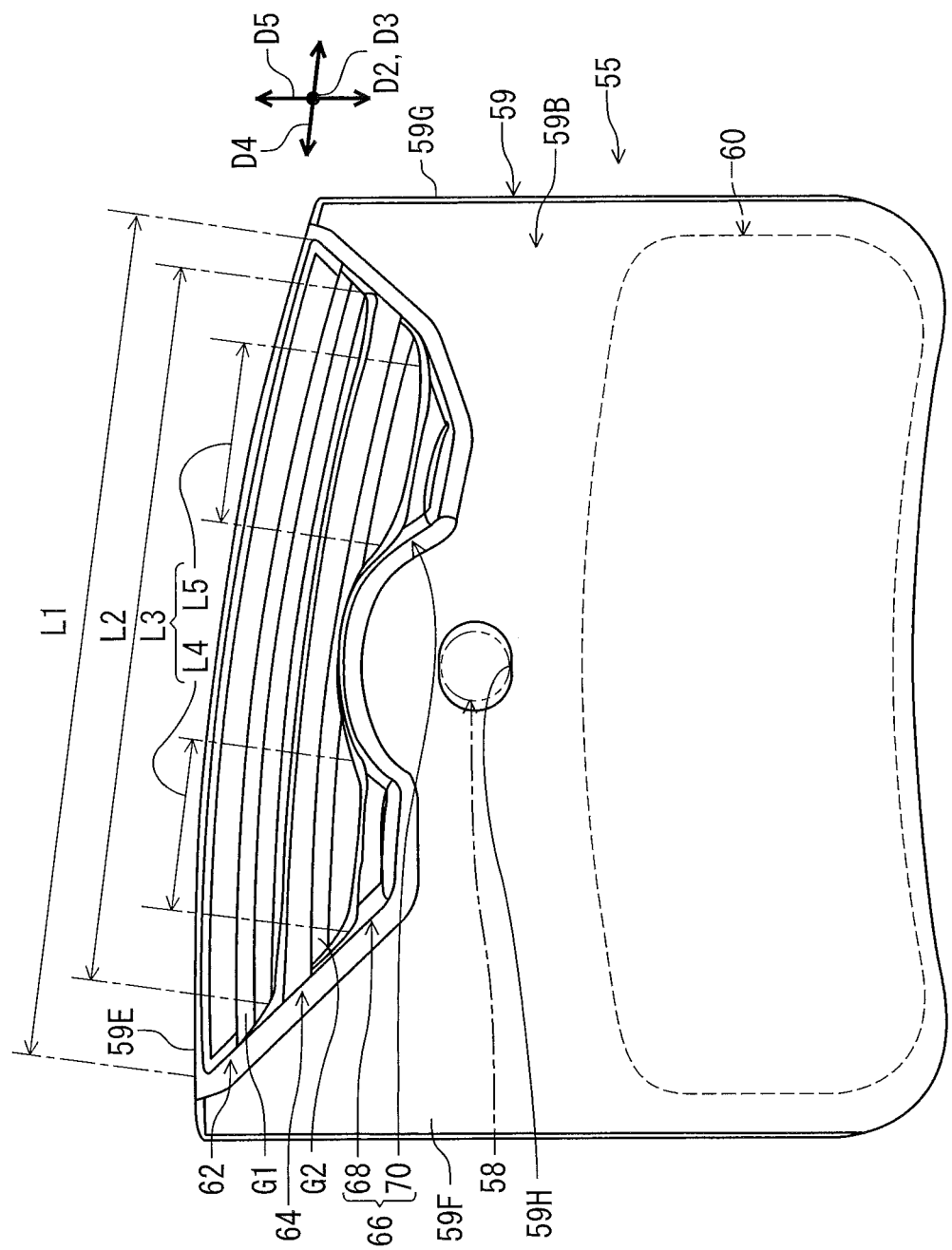
FIG. 12 is a side elevational view of a disc brake pad in accordance with a modification.

In the disc brake caliper 10 depicted in FIG. 7, the disc brake pad 55 includes the additional plate 61. As seen in FIG. 12, however, the additional plate 61 can be omitted from the disc brake pad 55 if needed or desired. In the modification depicted in FIG. 12, for example, the friction pad 60 is attached to the base plate 59 with adhesive. The same modification can be applied to the disc brake pad 56.

The base plate 59 of the disc brake pad 55 can be made of one of a metallic material and a non-metallic material. The friction pad 60 can be made of one of a metallic material and a non-metallic material. The additional plate 61 can be made of one of a metallic material and a non-metallic material. In the disc brake pad 55 depicted in FIG. 7, for example, the base plate 59 is made of a non-metallic material while the friction pad 60 is made of a metallic material. The additional plate 61 is made of a metallic material. The friction pad 60 is coupled to the additional plate 61. Examples of the metallic material for the friction pad 60 include iron, copper and graphite. In the disc brake pad 55 depicted in FIG. 11, the base plate 59 is made of a non-metallic material while the friction pad 60 is made of a non-metallic material. The friction pad 60 is attached to the base plate 59 with adhesive. Examples of the non-metallic material for the friction pad 60 include a resin material such as synthetic resin. In this case, the friction pad 60 is made of the resin material and fiber material. Examples of the fiber material includes aramid fiber and zinc fiber. The above materials and the modifications thereof can be applied to the disc brake pad 56.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A disc brake pad comprising:
   a base plate including a first surface;
   a friction pad provided on the first surface;
   a first fin extending along a first edge of the base plate, the first fin including a first fin end and protruding from the base plate to the first fin end in a first direction, the first fin having a first distance defined between the first surface and the first fin end in the first direction; and
   a second fin including a second fin end and protruding from the base plate to the second fin end in the first direction, the second fin having a second distance defined between the first surface and the second fin end in the first direction, the second distance being longer than the first distance.

2. The disc brake pad according to claim 1, further comprising
   a third fin including a third fin end and protruding from the base plate to the third fin end in the first direction, wherein
   the third fin has a third distance defined between the first surface and the third fin end in the first direction, and
   the third distance is longer than the first distance.

3. The disc brake pad according to claim 2, wherein
   the first fin extends in a second direction defined along the first surface,
   the second fin extends in the second direction,
   the third fin extends in the second direction,
   the first fin has a first length defined in the second direction,
   the second fin has a second length defined in the second direction,
   the third fin has a third length defined in the second direction,
   the first length is different from each of the second length and the third length.

4. The disc brake pad according to claim 3, further comprising
   an additional base part provided between the second fin and the third fin as viewed in the first direction.

5. The disc brake pad according to claim 4, wherein
   the second fin protrudes from the additional base part to the second fin end in the first direction,
   the second fin has a second additional distance defined between the additional base part and the second fin end in the first direction,
   the third fin protrudes from the additional base part to the third fin end in the first direction,
   the third fin has a third additional distance defined between the additional base part and the third fin end in the first direction, and
   the third additional distance is longer than the second additional distance.

6. The disc brake pad according to claim 5, wherein
   the fourth fin includes a fourth fin end and protrudes from the first surface to the fourth fin end in the first direction,
   the fourth fin has a fourth distance defined between the first surface and the fourth fin end in the first direction, and
   the fourth distance is longer than the first distance.

7. The disc brake pad according to claim 6, wherein
   the fifth fin includes a fifth fin end and protrudes from the first surface to the fifth fin end in the first direction,
   the fifth fin has a fifth distance defined between the first surface and the fifth fin end in the first direction, and
   the fifth distance is longer than the first distance.

8. The disc brake pad according to claim 7, wherein
   the fifth distance is equal to the fourth distance.

9. The disc brake pad according to claim 5, wherein
   the base plate includes a hole, and
   the third fin is spaced apart from the hole.

10. The disc brake pad according to claim 5, wherein
    the third fin includes a fourth fin and a fifth fin, and
    the fourth fin is spaced apart from the fifth fin.

11. The disc brake pad according to claim 5, wherein
    the fourth fin and the fifth fin are spaced apart from the hole.

12. The disc brake pad according to claim 3, wherein
    the second length is different from the third length.

13. The disc brake pad according to claim 3, wherein
    the first length is longer than each of the second length and the third length.

14. The disc brake pad according to claim 3, wherein
    the second length is longer than the third length.

15. The disc brake pad according to claim 3, wherein
    the second fin is at least partially provided between the first fin and the third fin.

16. The disc brake pad according to claim 2, wherein
    the third distance is longer than the second distance.

17. The disc brake pad according to claim 1, wherein
    the first fin extends in a second direction defined along the first surface,
    the second fin extends in the second direction,
    the first fin has a first length defined in the second direction,
    the second fin has a second length defined in the second direction, and
    the first length is different from the second length.

18. The disc brake pad according to claim 17, wherein
    the first length is longer than the second length.

19. The disc brake pad according to claim 1, wherein
    the second fin end of the second fin is provided entirely father from the first surface than the first fin end of the first fin in the first direction.

20. The disc brake pad according to claim 19, wherein
    the second fin end of the second fin is provided entirely father from the first surface than the first fin end of the first fin in the first direction, and
    the third fin end of the third fin is provided entirely father from the first surface than the first fin end of the first fin in the first direction.

21. The disc brake pad according to claim 1, wherein
    the second fin is provided closer to the friction pad than the first fin as viewed in the first direction.

22. The disc brake pad according to claim 1, further comprising
an additional plate attached to the base plate, wherein
the base plate includes a second surface provided on a reverse side of the first surface, and
the additional plate is provided on the second surface.

23. The disc brake pad according to claim 1, wherein
the first fin protrudes from the base plate away from the friction pad, and
the second fin protrudes from the base plate away from the friction pad.

24. A disc brake caliper comprising
a caliper body configured to be mounted to a vehicle body of a human-powered vehicle; and
the disc brake pad according to claim 1, the disc brake pad being movable relative to the caliper body in the first direction.

25. A disc brake pad comprising:
a base plate including a first surface;
a friction pad provided on the first surface;
a first fin including a first fin end and protruding from the base plate to the first fin end in a first direction, the first fin having a first distance defined between the first surface and the first fin end in the first direction, the first fin extending along a second direction defined along the first surface, the first fin having a first length defined in the second direction; and
a second fin including a second fin end and protruding from the base plate to the second fin end in the first direction, the second fin having a second distance defined between the first surface and the second fin end in the first direction, the second distance being longer than the first distance, the second fin extending in the second direction, the second fin having a second length defined in the second direction, the first length being longer than the second length, the second fin being provided closer to the friction pad than the first fin as viewed in the first direction.

* * * * *